E. G. R. ANGEL.
METHOD OF COOLING LIQUIDS.
APPLICATION FILED JULY 27, 1920.
1,435,142.
Patented Nov. 14, 1922.
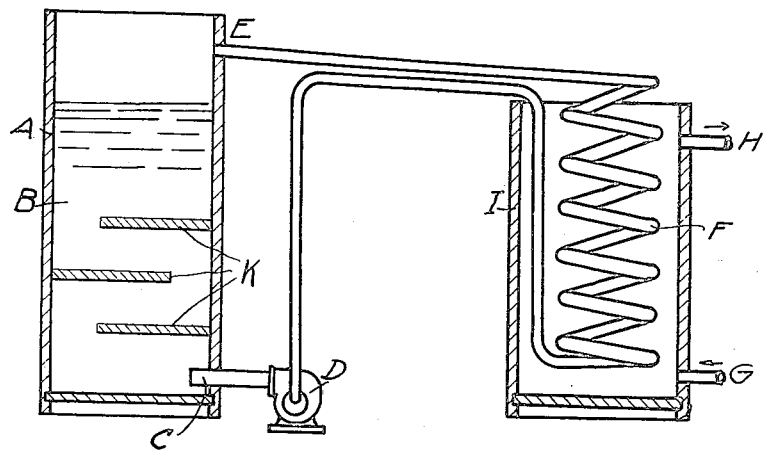
Inventor.
Erik G. R. Angel,
By Henry Orth
Atty.

Patented Nov. 14, 1922.

1,435,142

UNITED STATES PATENT OFFICE.

ERIK GUSTAF ROBERT ANGEL, OF TROLLHATTAN, SWEDEN.

METHOD OF COOLING LIQUIDS.

Application filed July 27, 1920. Serial No. 399,348.

*To all whom it may concern:*

Be it known, that I, ERIK GUSTAF ROBERT ANGEL, a citizen of the Kingdom of Sweden, residing at Trollhattan, Sweden, have invented new and useful Improved Methods of Cooling Liquids (for which applications for patents have been filed in Sweden, June 27, 1919; Norway, June 23, 1920; Finland, June 26, 1920, and Germany, June 26, 1920), of which the following is a specification.

This invention relates to an improved method of cooling liquids.

In the technical and especially in the chemical industry it is a frequently occurring problem to cool a liquid, generally a water solution of one or more substances. The method generally used for said purpose consists in circulating a cooling agent, as for instance cold water or a salt solution, in pipes submerged in a vessel containing the liquid to be cooled, or to use cooling vessels having double walls or bottoms and circulating the cooling agent through the intermediate space between said walls or bottoms. In both cases there arise generally the following drawbacks. The transmission of the heat from the solution through the cooling wall to the cooling agent requires always a considerable difference of temperature so that the temperature of the cooling agent must be kept at a considerably lower temperature than that of the cooled solution. When the cooling is followed by a cristallization or separation of solid substances from the solution, said substances generally deposit on the cooling walls and isolate them causing a reducing of the cooling action. Furthermore, it is generally difficult to remove the deposited solid substances from the pipes or walls, which difficulty is increased with the risk of damaging the pipes or walls in such cases when, on account of the properties of the solution, it is necessary to use apparatus of lead, earthenware, glass, or other substances which are not sufficiently resistent against shocks.

According to this invention said drawbacks are removed by acting upon the liquid to be cooled by direct contact with the cooling agent in such manner that the liquid to be cooled and the cooling agent are directly mixed with one another. For avoiding the dilution and befouling of the liquid to be cooled I use according to this invention a cooling agent of such properties that it is not solved or emulsified in the liquid to be cooled and does not chemically react therewith. The cooling agent is suitably so chosen that its specific gravity is different from that of the liquid to be cooled. As such cooling agent may be used, when for instance salt solutions are to be cooled, petroleum, naphtha, tar oils, and so on. Other cooling liquids which may be used, dependent on the properties of the liquid to be cooled, are paraffin oil, lubricating oil, motor oil, benzine, benzol, and other hydrocarbons, carbon tetrachloride, trichlorethylene, aldehyde, alcohol, and fatty acids. After the cooling has taken place the liquid and the cooling agent are separated from each other on account of their different specific gravities as for instance in such manner that they are left to separate in a storing vessel from which they are then drawn off by means of separate outlets. The cooling agent is after use again cooled in any usual manner, as for instance by means of cold water in pipes, by the generator coils of a cooling machine, by means of air cooling, or in such manner as above described by circulating the cooling agent through cold water or other cooling liquid in direct contact therewith.

In the annexed drawing I have diagrammatically shown an embodiment of an apparatus for performing my improved cooling method.

The vessel A contains the liquid to be cooled. The cooling agent is supplied to the vessel A by means of a centrifugal pump D through the nozzle C, from which it flows up in a finely divided state on account of its lower specific gravity through the liquid and cools the latter. For effecting a good stirring action in the liquid to be cooled the nozzle has preferably an oblique disposition in the vessel so that the cooling agent supplied causes the liquid to rotate. The cooling agent collects on the liquid B and flows off through the overflow outlet E to the cooling coil F, which is submerged in a vessel I having a supply pipe G for cold water and an outlet pipe H for the heated water. During the circulation of the cooling agent by means of the pump D it takes up heat from the liquid B which is accordingly cooled, and delivers said heat to the cooling water in the vessel I. When the liquid B contains dissolved substances which are hardly soluble at lower temperatures said substances cristallize during the cooling and deposit on the bottom of the vessel A without disturbing the cooling operation.

The cooling operation may be carried out also in other manners than that illustrated by the drawing. As for instance the circulation of the cooling agent may be performed by means of pressure air which is blown into the cooling agent and exerts an ejector action thereon. Furthermore, the whole cooling operation may be performed in a single vessel in such manner that a cooling liquid is circulated through a coil in the upper part of the vessel above the level between the liquid to be cooled and the cooling agent while the cooling agent is circulated by means of a pumping device and is introduced at the bottom of the vessel.

Instead of using a cooling agent having a lower specific gravity than the liquid to be cooled I can also use a cooling agent having a greater specific weight than the liquid, in which case the cooling agent is introduced in the liquid at the upper level and sinks down through the liquid by the gravity and is drawn off at the bottom.

It is to be noted that the intimate contact between the liquid and the cooling agent should be facilitated as far as possible, as for instance by disposing a number of plates or walls K in the vessel A thus increasing the way of the cooling agent through the liquid. For the nozzle C other means may be substituted which cause a division of the cooling agent into fine drops, as for instance a perforated coil, which is disposed at the bottom of the vessel A, a plurality of nozzles, or a number of blast nozzles through which the cooling agent is introduced by means of pressure air which causes the cooling agent to be finely distributed in the liquid.

What I claim is:—

1. The method of cooling liquids, which comprises mixing the liquid to be cooled with a liquid cooling agent of such properties that it is not solved or emulsified in the liquid to be cooled, nor chemically acted upon by the said liquid, and then separating the cooling agent from the liquid cooled.

2. The method of cooling liquids, which comprises introducing a liquid cooling agent of less specific gravity than that of the liquid to be cooled below the surface of the latter thus causing the cooling agent to flow upwards through the liquid to be cooled by the action of the gravity, and drawing off the cooling agent from the surface of the liquid cooled.

3. The method of cooling liquids, which comprises introducing a liquid cooling agent into the liquid to be cooled in such direction that the latter is caused to rotate, and to be intimately mixed with the cooling agent, and then separating the cooling agent from the cooled liquid.

In testimony whereof I have signed my name.

ERIK GUSTAF ROBERT ANGEL.